United States Patent

Adamczyk, Jr. et al.

[11] Patent Number: 5,524,433
[45] Date of Patent: Jun. 11, 1996

[54] METHODS AND APPARATUS FOR MONITORING THE PERFORMANCE OF HYDROCARBON ENGINE EMISSION TRAPPING DEVICES

[75] Inventors: Andrew A. Adamczyk, Jr.; Jeffrey S. Hepburn, both of Dearborn, Mich.

[73] Assignee: Ford Motor Company, Dearborn, Mich.

[21] Appl. No.: 364,909

[22] Filed: Dec. 27, 1994

[51] Int. Cl.$^6$ .................................................. F01N 3/28
[52] U.S. Cl. .................. 60/276; 60/277; 60/279; 60/297; 60/311
[58] Field of Search ............................ 60/276, 277, 279, 60/297, 311, 274

[56] References Cited

U.S. PATENT DOCUMENTS

| | | | |
|---|---|---|---|
| 3,645,098 | 2/1972 | Templin et al. | 60/279 |
| 3,674,441 | 7/1972 | Cole | 60/297 |
| 4,007,589 | 2/1977 | Neidhard et al. | 60/277 |
| 5,125,231 | 6/1992 | Patil et al. | 60/297 |
| 5,158,753 | 10/1992 | Take et al. | 60/297 |
| 5,179,833 | 1/1993 | Kuroda et al. | 60/276 |
| 5,214,915 | 6/1993 | Schneider et al. | 60/274 |
| 5,253,476 | 10/1993 | Levendis et al. | 60/279 |
| 5,259,189 | 11/1993 | Baier et al. | 60/276 |
| 5,307,627 | 5/1994 | Christensen et al. | 60/297 |
| 5,379,586 | 1/1995 | Honji | 60/297 |

*Primary Examiner*—Douglas Hart
*Attorney, Agent, or Firm*—Donald A. Wilkinson; Roger L. May

[57] ABSTRACT

Methods and apparatus are provided for monitoring the performance of a hydrocarbon trapping device which removes hydrocarbons from an engine exhaust stream during cold startup conditions before the catalyst has reached its light-off temperature. The electronic engine controller which provides conventional fuel control functions is used to numerically integrate sensed values during a predetermined time interval in the engine's startup period. The sensed values indicate the rate at which hydrocarbons are being retained or purged by the trap, and the result of the integration indicates the total amount of hydrocarbon molecules trapped or purged. The integration result values may be retained for future readout during diagnostic procedures, and the result values may be compared with a threshold value to generate an alarm indication whenever the integration result value indicates that the trap is not performing satisfactorily.

11 Claims, 6 Drawing Sheets

METHODS AND APPARATUS FOR MONITORING THE PERFORMANCE OF HYDROCARBON ENGINE EMISSION TRAPPING DEVICES

FIELD OF THE INVENTION

This invention relates to systems for reducing unwanted emissions from internal combustion engines and, more particularly, to methods and apparatus for monitoring the performance of devices which trap hydrocarbons from the exhaust flow during cold engine startup periods.

BACKGROUND OF THE INVENTION

Catalytic converter devices used in motor vehicles to reduce emissions of certain fuel combustion products may be somewhat less efficient at operating temperatures below their so called light-off temperature. Typically, following start-up of a cold engine, a short period of time passes before the light-off temperature is reached. In order to reduce unwanted emissions, it is desirable to use a hydrocarbon (HC) trapping device to remove certain hydrocarbon combustion products from the engine's exhaust gas stream during the period following a cold engine start when the primary catalyst has not yet reached its light-off temperature. To reduce these emissions, HC trapping devices have been proposed to capture and hold at least selected HC combustion production until a later time when they can be recycled and eliminated by the more fully heated engine or operational catalytic converter. To recycle the accumulated hydrocarbons, the trapping device is purged after the cold starting period, the stored hydrocarbons being released and routed to the catalyst or to the engine for further processing and conversion to a less harmful chemical form.

It is desirable in certain applications to ensure that such HC trapping devices continue to operate properly during the life of the vehicle. While the performance of the primary catalyst is typically monitored by sensing the oxygen storage ability of the catalyst and relating this property to the catalyst's ability to convert hydrocarbons, HC trapping devices do not store oxygen as catalysts do, and the systems and methodologies utilized for catalysts cannot be used for HC trapping devices. A need exists, therefore, for methods and apparatus capable of effectively monitoring the performance of HC trapping devices to ensure their continued proper operation.

It is accordingly a principal object of the present invention to accurately and inexpensively monitor the performance of hydrocarbon trapping devices of the type used to reduce hydrocarbon emissions during cold engine startup conditions.

SUMMARY OF THE PRESENT INVENTION

In a principle aspect, the present invention takes the form of methods and apparatus for monitoring the operation of hydrocarbon trapping devices by obtaining measured values which indicate the aggregate amount of hydrocarbon molecules removed from the exhaust stream during startup conditions, and providing an output manifestation of the performance of the trap based on the derived aggregate value. According to a further feature, the derived aggregate values for successive engine startup cycles may be stored to provide historical baseline data indicative of satisfactory device performance. Means are then employed for comparing the current performance of the system as indicated by recently obtained aggregate values with the historical data or some other previously determined threshold value, providing an output signal or warning indicating any actual or potential degradation of the performance of the HC trapping device below an acceptable level.

In its preferred form, the invention is used in combination with an internal combustion engine equipped with an exhaust system incorporating a hydrocarbon trapping device having an inlet port and an outlet port for routing the combustion products from the engine through a hydrocarbon absorbing material during cold engine startup conditions before the exhaust system has reached its normal elevated operating temperature. Means are employed for generating a measured value indicative of the rate at which the quantity of hydrocarbons captured by the absorbing material is changing, in combination with processing means for numerically integrating or otherwise combining the measured values to generate an aggregate output value indicative of the amount of hydrocarbons absorbed or desorbed during or following each engine startup period, the resulting aggregate value serving as a current measure of the effectiveness of the hydrocarbon trapping device.

In one preferred embodiment, means are employed for saving the output values produced during each engine startup cycle to provide historical data indicative of the past performance of the trapping device. This historical data can then be provided to diagnostic readout devices in the form of a historical data log, or may be compared with the current output value, producing an immediate warning indication whenever the current output value departs significantly from past output values, signifying a potentially unacceptable degradation in the trapping device's performance. Alternatively, the derived aggregate value can be immediately compared with a predetermined threshold value to provide an alarm signal indicating a probable HC trap malfunction.

The preferred embodiments of the invention utilize devices which are either readily available or already present in the engine control system. The numerical integration and other processing operations needed to monitor the operation of the tracking device may be advantageously performed by the existing electronic engine controller which includes a microprocessor and which typically has existing access to some or all of the system variables needed for monitoring HC trapping device performance in accordance with the invention since many of the same sensed or computed variables are used in conventional fuel control processing. The invention is accordingly able to effectively monitor the operation of the trapping device and to help ensure low levels of undesirable exhaust emissions under cold start conditions without significantly increasing the cost of the vehicle. Feedback from the monitoring system may in certain embodiments be utilized by engine control devices, such as an electronic engine control module, as one of various input signals, e.g., for air/fuel ratio control etc.

These and other features and advantages of the present invention will be more apparent by considering the following detailed description which is presented in connection with the attached drawings.

DESCRIPTION OF THE PREFERRED EMBODIMENTS

Each of the preferred embodiments to be described operates in combination with a conventional secondary hydrocarbon trapping device used to substantially reduce hydrocarbon emissions before the primary catalyst has been heated to its light-off temperature by the exhaust gases or other means. The secondary hydrocarbon trap has inlet and outlet ports interconnected with the exhaust to absorb (or adsorb) hydrocarbons from the exhaust gases during the cold-start interval. Thereafter, the trapped hydrocarbons are purged (desorbed) from the trapping device after the engine and the primary catalyst system have reached their elevated operating temperatures. U.S. Pat. No. 5,307,527 issued on May 3, 1994; U.S. Pat. No. 5,125,231 issued on Jun. 30, 1992; and U.S. Pat. No. 3,645,098 issued Feb. 29, 1972, the disclosures of which are incorporated herein by reference, describe representative emission control systems using such secondary hydrocarbon trapping devices.

Figure 1:
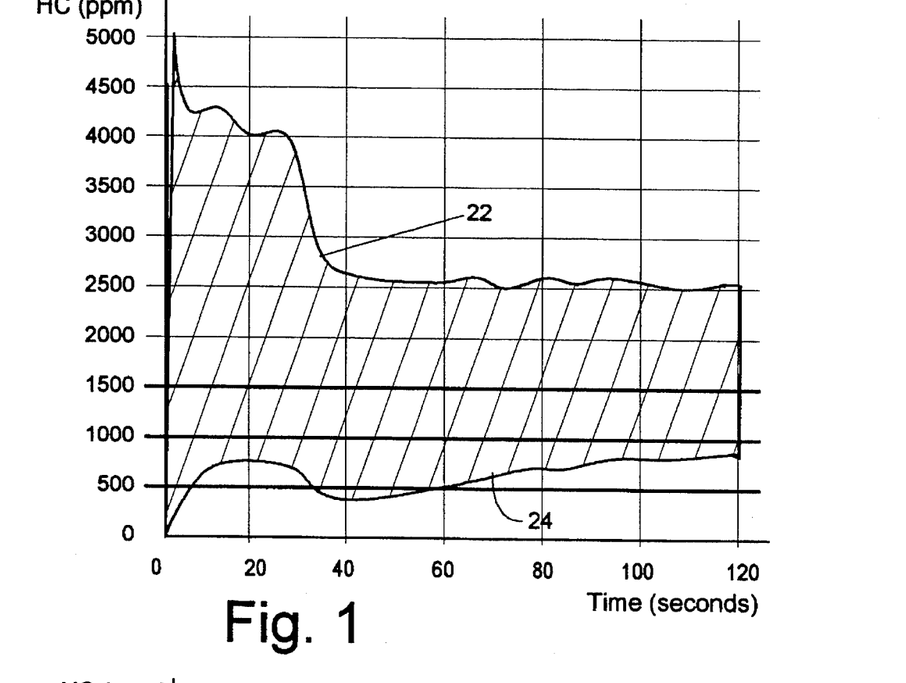
FIG. 1 is a graph showing the relative concentrations of hydrocarbons at the inlet (curve 22) and outlet (curve 24) ports respectively of a hydrocarbon trapping device during the cold start portion of an engine operating cycle when the trapping device is absorbing hydrocarbons.
Figure 2:
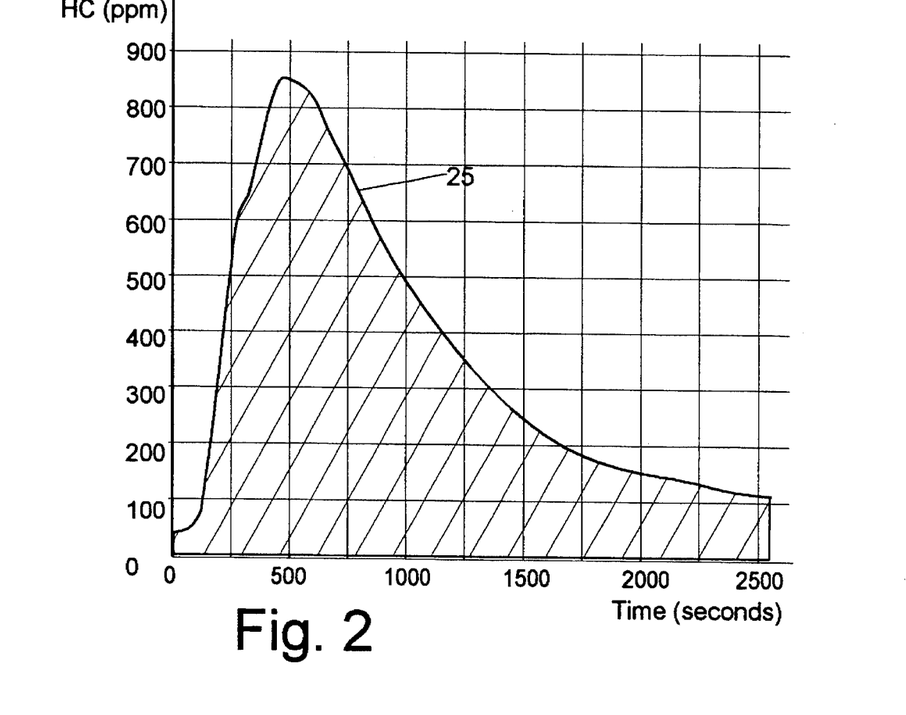
FIG. 2 is a graph showing the relative concentrations of hydrocarbons at the inlet and outlet ports of the trapping device during the period following the cold start, when hydrocarbons are being purged (desorbed) from the trapping device.

The absorption of hydrocarbons by such a trapping device is shown in the graph of FIG. 1, while the purging of hydrocarbons from the trapping device is shown in the graph of FIG. 2. In FIG. 1 the concentration of hydrocarbons at the inlet port (upstream of the HC trap) is illustrated, in parts per million, by the curve 22, while curve 24 shows the reduced concentration at the outlet port (downstream of the HC trap). The shaded area between curves 22 and 24 accordingly represents the total amount of hydrocarbon molecules absorbed in the trap. The curves shown in FIG. 1 indicate HC concentrations as a function of time for a typical HC trapping device when mounted in the exhaust system of a 3.0 L V-6 engine attached to an engine dynamometer as measured using a flame ionization detector in an emissions analyzer. A numerical value indicating the total amount of hydrocarbons trapped, as shown by the shaded area between curves 22 and 24 in FIG. 1, may be obtained by integrating (numerically summing) the product of the instantaneous difference between the sensed inlet and outlet HC concentrations multiplied by the instantaneous volumetric flow rate from the engine or through the trap.

During the period after the engine and the exhaust system have reached an elevated operating temperature, the trapping device should be purged of hydrocarbons to regenerate it for use during the next engine startup period. As shown in FIG. 2, the total amount of hydrocarbons desorbed from the trap during this purging interval is indicated by the shaded area below the curved line 25 which indicates the hydrocarbon concentration at the outlet port of the trap when the trap is purged by secondary air having little or no hydrocarbon content (as indicated by the baseline of FIG. 2). A numerical value indicating the total amount of HC desorbed during the purging cycle can thus be obtained by integrating the instantaneous amount of measured HC outlet concentration multiplied by the instantaneous purge flow rate through the trap.

Either of these aggregate numerical values, whether they indicate the amount of hydrocarbon trapped or purged, can be compared with either a predetermined threshold value or compared to like values previously obtained by monitoring the HC trapping device during prior engine startup cycles. The processing needed to produce the aggregate values as well as for comparing the aggregate values with values representing acceptable performance is preferably performed using the vehicle's existing, on-board electronic engine control (EEC) unit, as discussed in more detail below, or by means of a separate analog or digital integrator and comparator. If the amount trapped or desorbed shows a marked decrease from normal satisfactory operating levels, an error code can be logged in the EEC where it can be accessed during diagnostic routines, and/or a warning light can be illuminated to alert the operator that a potential or existing emissions system malfunction has been detected.

FIGS. 3–11 of the drawings illustrate embodiments of the invention which can be used to advantage with a variety of differing engine exhaust systems to monitor the performance of HC trapping devices. These embodiments are arranged in two general categories: (1) the embodiments shown in FIGS.

3 and 4 determine the amount of hydrocarbons stored in the trap by analyzing the absorption process during the cold start interval, and (2) the embodiments illustrated in FIGS. 5–11 monitor the performance of the trap during the purge cycle which follows the cold start interval.

Figure 3:
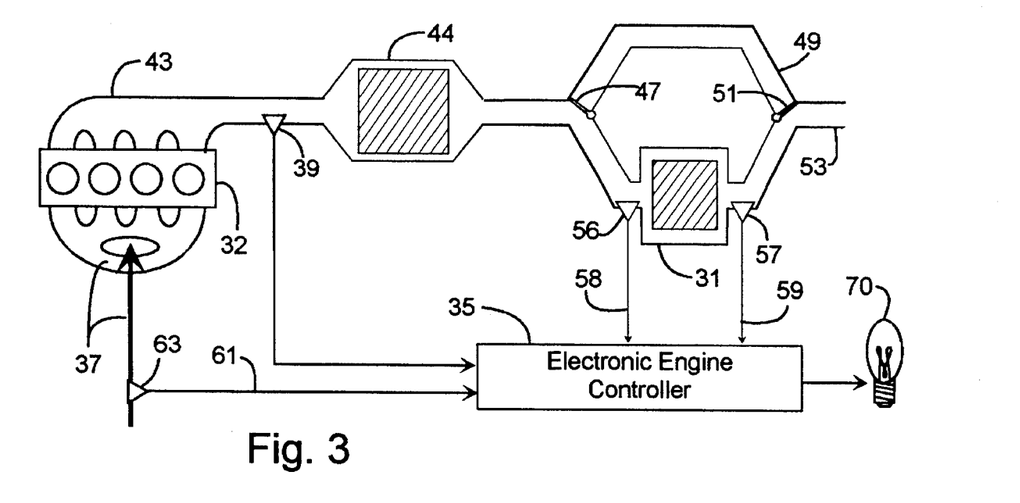
FIG. 3 is a block diagram of a first embodiment of the invention which operates during the absorption (cold start) period of the engine cycle by measuring the amount of hydrocarbons absorbed using Universal Exhaust Gas Oxygen ("UEGO") sensors or HC sensors at the inlet and outlet ports of the trapping device.

Monitoring System Environment. FIG. 3 illustrates a first embodiment of the invention which is used to monitor the operation of a conventional hydrocarbon trapping device 31 which absorbs hydrocarbon molecules from the combustion products exhausted by an internal combustion engine 32. A conventional electronic engine controller (EEC) indicated at 35 controls the rate at which fuel is injected into the intake air supplied to the engine via the engine's intake manifold 37. The EEC 35 is connected to an exhaust gas oxygen (EGO) level sensor 39 by line 41 and controls the fuel delivery rate to hold the exhaust gases emitted from the engine via the exhaust manifold 43 substantially at stoichiometry.

The exhaust system includes a conventional catalyst 44 which is connected between the exhaust manifold 43 and a controlled exhaust-flow valve 47 which, during the cold-start period, routes exhaust gases to the hydrocarbon trap 31 and, during normal operation after the catalyst 44 has reached its light-off temperature, routes the exhaust gases from catalyst 44 around the trapping device 31 via a bypass pipe 49. A second exhaust-flow valve 51 operates in concert with the valve 47 to connect first the trapping device 41 and then the bypass pipe 49 to an exhaust pipe 53.

The embodiment of the invention shown in FIG. 3 uses a pair of UEGO sensors, or alternatively hydrocarbon sensors, 56 and 58 positioned at the inlet and outlet ports respectively of the trapping device 31. A universal EGO sensor is a proportional sensor. In contrast, an EGO sensor is a switching type sensor (that is, highly non-linear) and, therefore, is used to indicate typically only whether the exhaust gas is rich or lean of stoichiometry. A UEGO sensor can provide a linear response with respect to air/fuel ratio and so can be used advantageously in the embodiments disclosed here to determine lambda ($\lambda$) of the exhaust gases. Signal lines 58 and 59 connect the sensors 56 and 58 respectively to the EEC 35, and a third signal line 61 connects a conventional engine air mass flow sensor 63 to the EEC 35. The conventional EEC 35 typically includes a microprocessor, a ROM memory for storing control programs and configuration data, and a RAM memory for storing variable data, including numerically calculated values, including $\lambda_1$, a value indicating air/fuel ratio based on the value of the signal from the inlet port UEGO or HC sensor 56, and $\lambda_2$, the air/fuel ratio based on the value of the signal from the sensor 58. These values, together with the value AM(t) which indicates the mass flow from the engine based on the signal from the sensor 63, are used to form an aggregate output value $HC_{STORED}$ indicative of the total amount of hydrocarbons absorbed. The value $HC_{STORED}$ is formed by the EEC 35 performing numerical integration in accordance with the following relation:

$$HC_{stored} = \int_0^t C_1 \cdot \left( \frac{1}{\lambda_1} - \frac{1}{\lambda_2} \right) \cdot AM(t) \cdot \delta t \qquad (1)$$

for the case where a UEGO sensor is used or:

$$HC_{stored} = \int_0^t (C \text{ input}_{hc} - C \text{ out}_{hc}) \cdot AM(t) \cdot C_x \cdot \delta t \qquad (1a)$$

for the case where HC sensors are used to provide a signal which is proportional to the HC concentrations C input and C out at the inlet and outlet ports respectively, and where, for $HC_{STORED}$ and AM(t) are expressed in grams and lbm/hr, the conversion coefficient $C_1$=494,863.4 and the coefficient $C_x$ is 2,474,317.2.

In this and other embodiments of the invention to be described, the EEC 35 can be employed to perform both the preprocessing of variables and the numerical integration of these variables without adding significantly to the cost of the vehicle. For example, the value AM(t) is typically created by the EEC 35 in response to readings from the existing sensor 63 during the course of normal fuel control processing, and is readily available, without added cost, to EEC programs which execute the numerical integration to create a needed value indicating the amount of hydrocarbons trapped. Sensors 56 and 57 are the only additional hardware required to enable the EEC 31 to produce the desired value indicating the amount of hydrocarbons absorbed by the trap during the integration interval.

Using the first embodiment shown in FIG. 1, as well as the other embodiments to follow, the derived value indicating the performance of the hydrocarbon trap can be compared to a fixed value indicative of a minimum level of acceptable performance. When the resulting value is found to fall below this fixed value, an output manifestation, such as a warning lamp as seen at 70 in FIG. 3, may be activated to alert the operator to an existing or potential problem.

Alternatively, one or more error codes, or the actual values derived during each startup cycle, can be stored (or averaged) by the EEC and retained in its non-volatile, read/write, keep alive memory (KAM), which is also used for storing other engine control variables and values between engine operating periods when the ignition is off. In this way, historical data indicative of the past performance of the hydrocarbon trap can be made available during diagnostic processing.

The monitoring function of each of the embodiments described may further be made self calibrating by comparing each derived value which is indicative of current performance with one or more previously derived baseline values generated by the EEC when the hydrocarbon trap was operating optimally, e.g., shortly after its initial installation or replacement. Thereafter, the warning lamp 70 may be activated or an error code stored whenever the currently derived value differs by more than a predetermined amount from the earlier recorded baseline value(s).

Figure 4:
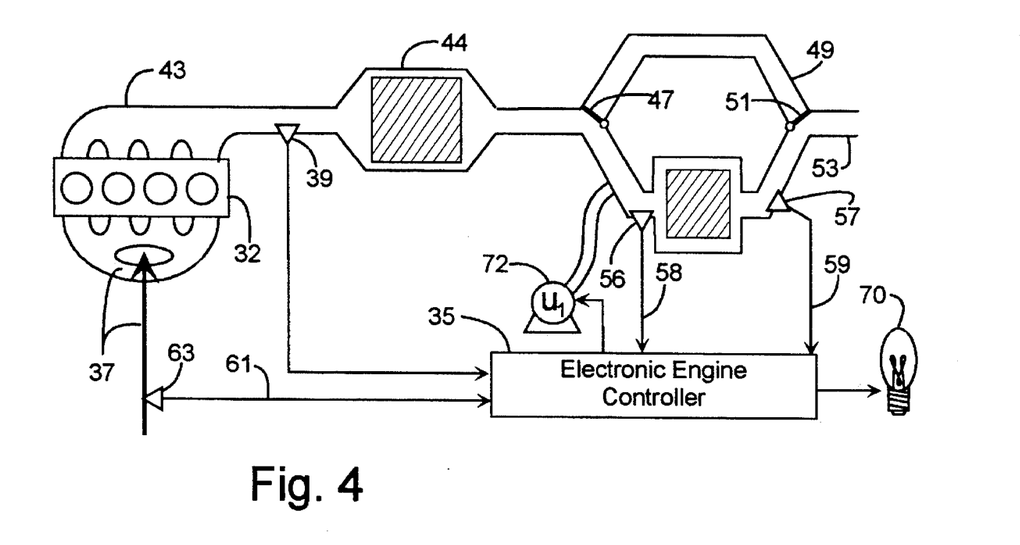
FIG. 4 is a block diagram of a second embodiment of the invention which operates when the trapping device is absorbing hydrocarbons, by monitoring a UEGO sensor at the outlet port of the trapping device while EGO sensor is used to control the injection of a secondary air source to maintain the exhaust gases entering the trap at the stoichiometric point during fuel rich start-up of the engine.

Alternative Preferred Embodiments. Other embodiments of the invention suited to particular engine and exhaust system configurations are shown in FIGS. 4–11. FIG. 4 shows a second embodiment for monitoring an active HC trap during the cold-start, storage period. Those components of the embodiment of FIG. 4 which are unchanged from the embodiment shown in FIG. 3 are indicated by the same reference numerals. The embodiment of FIG. 4 uses an EGO sensor 56 to provide feedback control of the air-metering device 72. The level of oxygen sensed by sensor 56 is processed by the EEC 35 to generate a control signal to the air metering device 72, increasing the flow of secondary air via device 72 whenever the exhaust gas stoichiometry sensed at 56 is rich, and decreasing the flow rate whenever the exhaust gas stoichiometry is lean, thereby maintaining the exhaust gases at the entrance to the trapping device near the stoichiometric point during fuel rich cold starting of the engine. Metering of the air into the exhaust stream can be accomplished in several common ways, such as a critical flow orifice, a pulse air valve, a pulse modulated solenoid valve, etc.

A UEGO sensor (57) senses the exhaust gases which exit the trapping devices. The value of $\lambda_2(t)$ which is provided along with the value of AM(t) is used to calculate the aggregate value of stored HCs. The total amount of HC stored by the trap on a grams basis is given by the relation:

$$HC_{stored} = \int_0^t C_{01} \cdot \left(1 - \frac{1}{\lambda_2}\right) \cdot AM(t) \cdot \delta t \quad (2)$$

where the conversion coefficient $C_2=494.863/45$ and AM(t) is the flow rate of air is in lbm/hr.

Figure 5:
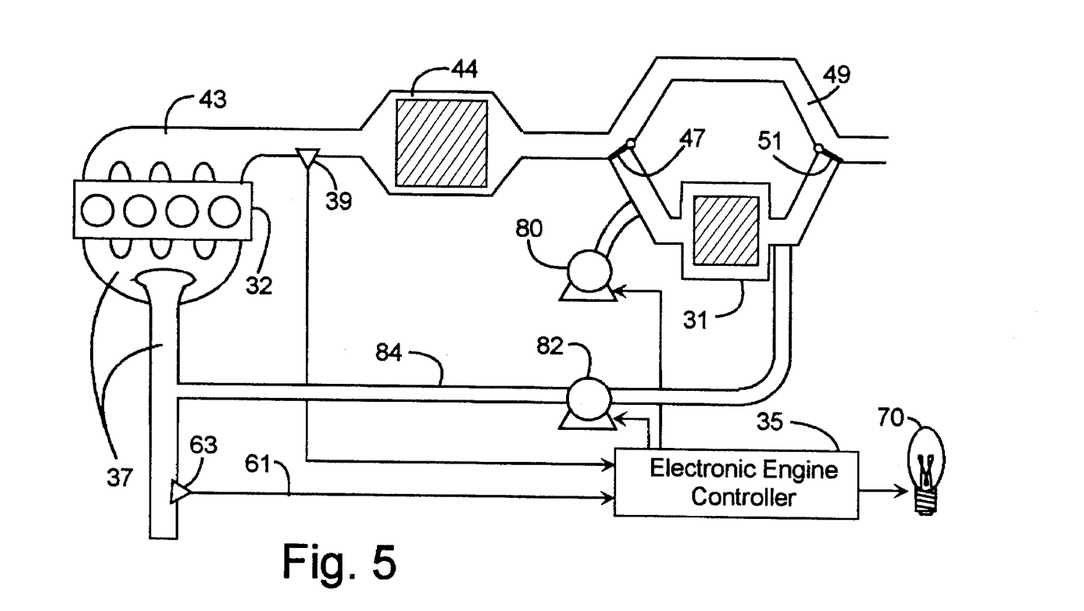
FIG. 5 is a block diagram of a third embodiment of the invention which, like the remaining embodiments, operates as the hydrocarbons are being purged from the trapping device after the conclusion of the engine startup period, the purged quantity being measured by monitoring the fuel delivery rate controlled by fuel control processes performed by the electronic engine controller.
Figure 6:
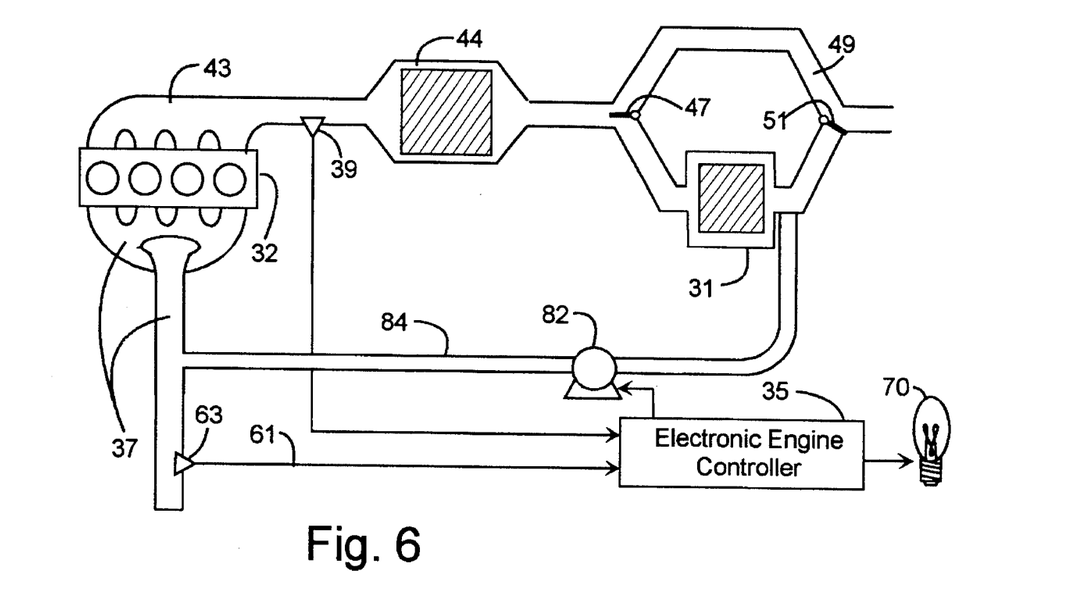
FIG. 6 is a block diagram of a fourth embodiment of the invention, in which hot exhaust gases maintained at stoichiometry are used to purge the trapping device, the amount of purged hydrocarbons being determined by monitoring the fuel delivery rate.

FIGS. 5 and 6 depict embodiments which monitor an active HC trap 31 after the cold start period when the trap is being purged with either hot exhaust gas or air. In both embodiments, the purging stream leaving the hydrocarbon trap 31 is directed into the 37 manifold of the engine 32.

In the embodiment of FIG. 5, the HC trap 31 is purged by a source of secondary air provided by either an air pump or a controlled leak through a check valve as indicated at 80. In FIG. 6, the HC trap is purged by hot exhaust gases, as indicated by the position of the valves 47 and 51. In both embodiments, the flow used to purge the trap 31 is passed through a return pipe 84 which connects the outlet port of the trap 31 to the engine intake manifold 37. The flow through the return pipe 84 may be controlled by a pump or check valve as indicated at 82.

The hydrocarbons in the purge stream through return pipe 84 are a source of fuel. As a result, the EEC 35 adjusts the fuel delivery rate downwardly under closed loop A/F control. The amount of hydrocarbons reintroduced to the engine via the pipe 84 can accordingly be quantified by monitoring the consequent change or shift in a calculated mean air/fuel which can be produced within the EEC during feedback A/F control of the engine with an EGO sensor located (39) upstream of the catalyst. For air purging, as illustrated in FIG. 5, the total HC desorbed from the trap on a grams basis may then be determined by the EEC 35 which is programmed to perform a numerical integration in accordance with the relation:

$$HC_{desorbed} = C_3 \cdot \left(1 - \frac{1}{lambse(t)}\right) \cdot (AM_1(t) - AM_2(t)) \cdot \delta t \quad (3)$$

where $C_3=109834.1$, $AM_1(t)$ is the outside air mass flow rate in lbm/hr as sensed at 63 and $AM_2(t)$ is the recirculated air mass flow rate through the return pipe 84 in lbm/hr.

Using a hot exhaust gas purge as illustrated in FIG. 6, the total HC desorbed from the trap on a grams basis is given by:

$$HC_{desorbed} = C_3 \cdot \left(1 - \frac{1}{lambse(t)}\right) \cdot AM_1(t) \cdot \delta t \quad (4)$$

where, as in equation (3), the conversion coefficient $C_3=109834.1$ and $AM_1(t)$ is the outside air mass flow rate in lbm/hr at sensor 63.

Figure 7:
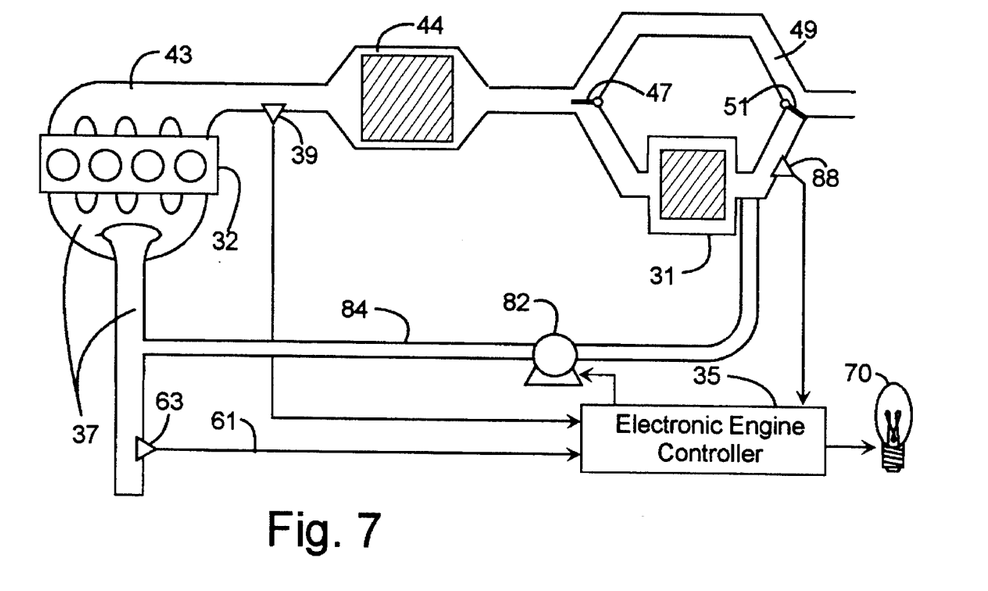
FIG. 7 is a block diagram of a fifth embodiment of the invention, in which hot exhaust gases at stoichiometry are used to purge the trapping device and an UEGO level sensor at the output port of the trapping device is used to determine the amount of hydrocarbons purged.
Figure 8:
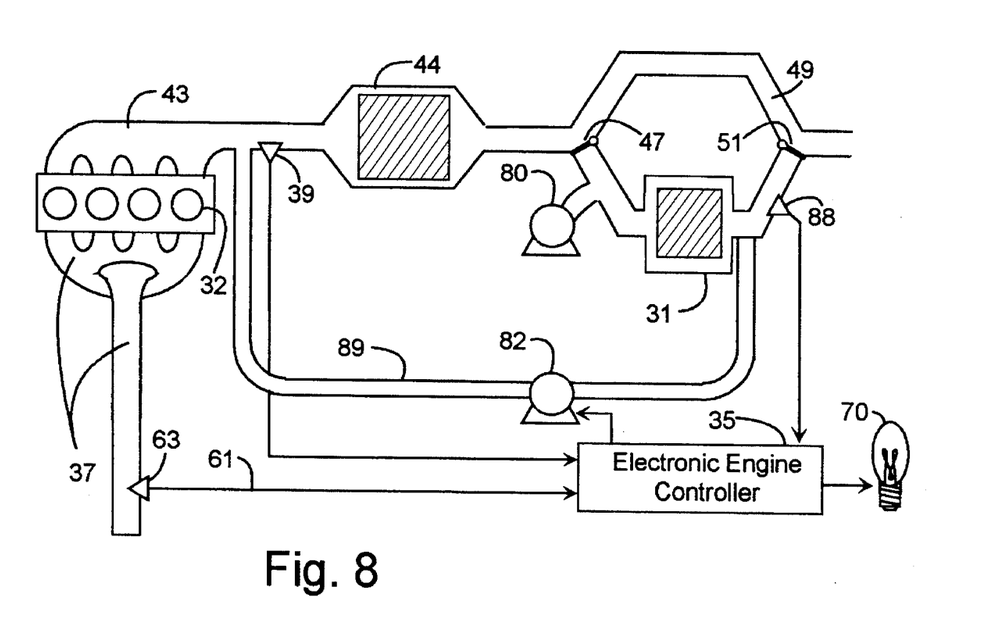
FIG. 8 a is block diagram of a sixth embodiment of the invention, in which secondary air is used to purge the trapping device and the amount of purged hydrocarbons is measured using an UEGO sensor at the trap outlet port.

FIGS. 7 and 8 show embodiments of the invention which monitor an active HC trap 31 with a single UEGO sensor 88 positioned downstream of the trap to measure the air/fuel ratio $\lambda(t)$. In the embodiment depicted in FIG. 7, the trap 31 is purged with hot exhaust gases which flow via a return pipe 84 into the intake manifold 37 of the engine 32. Under the control of the EEC 35 which determines the fuel delivery rate, the engine 32 produces a stoichiometric exhaust gas mixture at the inlet port to the trap 31. In the embodiment shown in FIG. 8, the trap 31 is purged with a secondary air source provided by either an air pump or a controlled leak through a check valve at indicated at 80, with the valves 47 and 51 being positioned to isolated the trap 31 from the exhaust gases as the trap is being purged.

In the embodiment of FIG. 7, in which the trap 31 is purged with hot exhaust gases, the total HC desorbed from the trap on a grams basis is given by:

$$HC_{desorbed} = C_4 \cdot (1 - \lambda(t)) \cdot AM_2(t) \cdot \delta t \quad (5)$$

where $C_4=103921.3$ and $AM_2(t)$ is the recirculated air mass flow rate in lbm/hr.

When purging with air in the embodiment of FIG. 8, the total HC desorbed from the trap on a grams basis is given by:

$$HC_{desorbed} = C_4 \cdot \frac{1}{\lambda(t)} \cdot AM_2(t) \cdot \delta t \quad (6)$$

Figure 9:
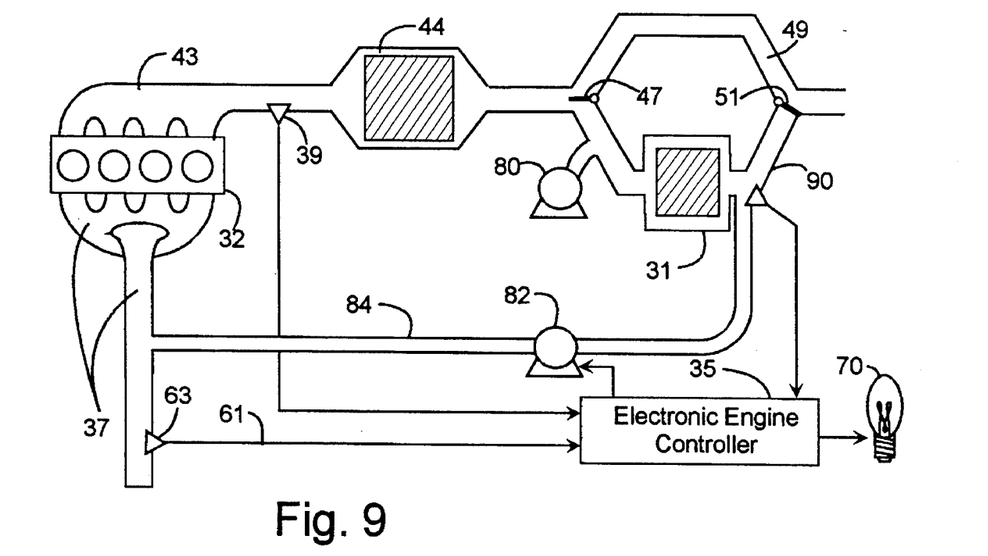
FIG. 9 is a block diagram of a seventh embodiment of the invention, in which a hydrocarbon sensor at the outlet port of the trapping device is used to measure the amount of hydrocarbons purged from the trapping device by exhaust gases or a secondary air source.

FIG. 9 shows an embodiment which monitors an active HC trap 31 with an HC sensor 90 positioned downstream from the trap. In this case, the HC trap 31 is purged into the intake manifold of the engine 32 via return pipe 84 by a secondary air source which is provided by an air pump, or a controlled leak through a check valve, as indicated at 80. The HC sensor 90 measures $HC_{OUT}$, the hydrocarbon concentration in the air stream at the outlet port of trap 31 during the desorption process. The total amount of hydrocarbons desorbed on a grams basis is given by:

$$HC_{desorbed} C_5 \cdot HC_{OUT} \cdot AM_2(t) \cdot \delta t \quad (7)$$

where the conversion coefficient $C_5=2,474,317.2$ and $AM_2(t)$ is the mass air flow rate through the return pipe 84 as measured or controlled by a pump or check valve indicated at 82.

Figure 10:
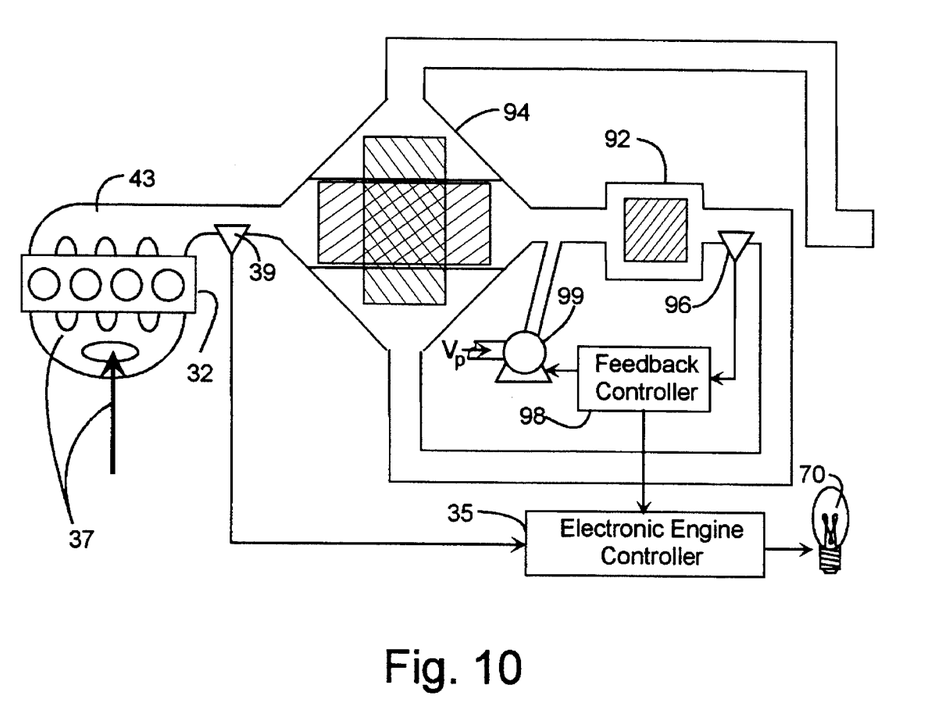
FIG. 10 is a block diagram of a eighth embodiment of the invention, using a feedback controller in combination with an EGO sensor to maintain stoichiometry at the outlet port of a passive trapping device, determining the purged amount by monitoring the amount of secondary airflow introduced at the inlet port of the trapping device.

FIG. 10 depicts the monitoring of a passive HC trap 92 which is connected to a monolithic cross flow catalyst made of either ceramic or of metal. An EGO sensor 96 is positioned downstream of the HC trap 92. The signal from the EGO sensor 96 is used as an input to a feedback controller 98, which may be either a proportional (P), proportional-integral (PI), or proportional-integral-differential (PID) controller. Feedback controller 98 regulates the flow of secondary air which is introduced at the inlet port of the trap 92 by a controlled pump or check valve as indicated at 99. The sensor 96, feedback controller 98 and air control 99 maintain the exhaust gas mixture downstream of the trap 92 at stoichiometry.

If the engine 32 is generating a stoichiometric exhaust gas, then the amount of air introduced into by the air control device 99, $V_p$, will be proportional to the amount of HC desorbed from the trap. The total HC desorbed on a mass basis is determined by the EEC 35 which performs a numerical integration in accordance with the relation:

$$HC_{desorbed} = \int_0^t C_4 \cdot V_p \cdot \delta t \quad (8)$$

were the coefficient $C_4$ has the value given earlier.

Figure 11:
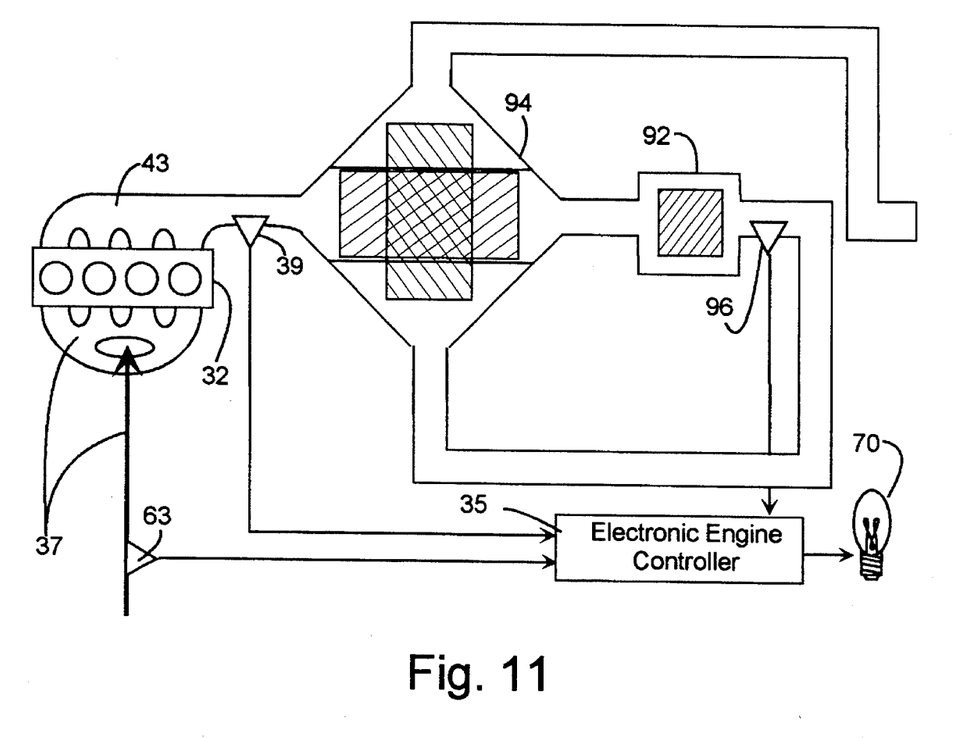
FIG. 11 is a block diagram of a ninth embodiment of the invention, which uses a hydrocarbon level sensor at the outlet port of a passive trapping device being purged with hot stoichiometric exhaust gases to measure the amount purged.

FIG. 11 depicts another arrangement for monitoring a passive HC trap 92 which employs a universal exhaust gas oxygen level (UEGO) sensor 96 to measure the air/fuel ratio $\lambda(t)$ of the exhaust gas during HC desorption as the gas exits the trap 31. As in the embodiment of FIG. 10, the arrangement shown in FIG. 11 relies on the EEC 35 to control the fuel supply to the engine such that the engine exhaust is maintained at stoichiometry during the purging process. The mass air flow into the engine's intake manifold $AM_1(t)$ is measured by the engine's conventional mass flow meter 63. The cumulative amount of HC desorbed from the trap 92 on a grams basis is determined by the EEC 35 which is programmed to perform a numerical integration in accordance with the relation:

$$HC_{desorbed} = \int_0^t C_4 \cdot (1 - \lambda(t)) \cdot AM_1(t) \cdot \delta t \qquad (9)$$

The embodiments of the invention which have been described above are merely illustrative applications of the principles of the invention and numerous modifications may be made to the arrangements described without departing from the spirit and scope of the invention.

What is claimed is:

1. An internal combustion engine comprising, in combination:

an intake system for supplying air and fuel to said engine;

an exhaust system for conveying combustion products from said engine;

a hydrocarbon trapping device having an inlet port and an outlet port for conveying gaseous material into and out of said trapping device;

means for connecting said ports to said exhaust system such that said trapping device absorbs hydrocarbon molecules from said combustion products during a cold startup time period before the exhaust system reaches its normal elevated operating temperature, and means for monitoring the effectiveness of the hydrocarbon trapping device which comprises, in combination, flow rate sensing means for producing an indication of the volume of material flowing through a given one of the ports, means responsive to the flow rate sensing means for producing a sequence of measured values indicative of the instantaneous rate at which of the quantity of hydrocarbon molecules held in the trapping device is changing as the material flows through said given port, means for numerically combining the sequence of measured values during a predetermined time interval in the operation of said engine to generate an aggregate value indicative of the extent to which the trapping device has absorbed hydrocarbon molecules, and output means for manifesting said total value as an indication of the effectiveness said trapping device.

2. The internal combustion engine as set forth in claim 1 wherein said means for manifesting the aggregate value as an indication of the effectiveness of the trapping device comprises, in combination, means for storing each of said aggregate values with previously stored aggregate values generated during past engine startup periods to create historical data indicative of the prior operation of the trapping device, and means for comparing said third value with the historical data to produce the output manifestation whenever the third value deviates substantially from a predetermined threshold value indicating a significant degradation in the effectiveness of the trapping device.

3. The internal combustion engine as set forth in claim 1 wherein said predetermined time period occurs when said trapping device is absorbing hydrocarbon molecules from said combustion products.

4. The internal combustion engine as set forth in claim 3 wherein said means for producing said measured values comprises, in combination, a first UEGO sensor positioned at said inlet port, a second UEGO sensor positioned at said outlet port, and means responsive to said first and said second oxygen level sensors for producing said measured values.

5. The internal combustion engine as set forth in claim 4 further comprising, in combination, means responsive to said oxygen sensors for generating the values $\lambda_1$ and $\lambda_2$ which are respectively indicative of the air to hydrocarbon ratio at said inlet and outlet ports, and means for producing a value AM(t) which has a magnitude proportional to said first measured value, wherein said means for producing said sequence of measured values forms the product of said first and second measured values, and wherein said means for combining said sequence of measured values comprises means for forming the value $HC_{stored}$ in accordance with the integration $$HC_{stored} = \int_0^t C_1 \cdot \left( \frac{1}{\lambda_1} - \frac{1}{\lambda_2} \right) \cdot AM(t) \cdot \delta t \qquad (1)$$

where the integration time interval 0 to t is said predetermined time period.

6. The internal combustion engine as set forth in claim 1 wherein said predetermined time period occurs when said trapping device is desorbing hydrocarbon molecules after the conclusion of said cold startup period.

7. The internal combustion engine as set forth in claim 6 wherein said sequence of measured values indicates the rate at which hydrocarbons are being desorbed from said trapping device during said predetermined time period.

8. The internal combustion engine as set forth in claim 7 including means for recirculating hydrocarbons purged from said trapping device to said engine wherein said means for generating said sequence of measured values includes an electronic fuel control system for maintaining the combustion products from said engine at stoichiometry and wherein said means for generating said sequence of measured values is responsive to the rate at which said fuel control system supplies fuel to said engine.

9. The internal combustion engine as set forth in claim 8 wherein said means for numerically combining said measured values comprises means for performing numerical integration in accordance with the relation:

$$HC_{desorbed} = C_3 \cdot \left( 1 - \frac{1}{lambse(t)} \right) \cdot AM_1(t) \cdot \delta t \qquad (4)$$

where $C_3$ is a constant, lambse(t) is a value indicative of said rate at which fuel is delivered to said engine, and $AM_1(t)$ is a value indicating the mass flow rate of the intake air supplied to said engine.

10. The internal combustion engine as set forth in claim 7 further comprising means for effectively disconnecting said inlet port of said trapping device from said exhaust system after the conclusion of said cold startup period and means for thereafter supplying flow of purging air through said trapping device, further including means for sensing the flow rate of said purging air and wherein said means for producing said sequence of measured values is responsive to said means for sensing the flow rate of said purging air.

11. The internal combustion engine as set forth in claim 10 further comprising, an electronic fuel control system for generating a fuel rate control signal having the value lambse(t) which varies to maintain the composition of said combustion products at stoichiometry, wherein said means for generating said sequence of measured values is responsive to said flow rate control signal, and wherein said means for numerically combining said sequence of measured values performs a numerical integration in accordance with the relation:

$$HC_{desorbed} = C_3 \cdot \left(1 - \frac{1}{lambse(t)}\right) \cdot (AM_1(t) - AM_2(t)) \cdot \delta t \qquad (3)$$

where $C_3$ is a constant and $AM_1(t)$ and $AM_2(t)$ are values respectively indicative of the air flow rate into said intake system and the rate of flow of purging air through said trapping device during said predetermined time interval.

* * * * *